(12) United States Patent
Goodnow et al.

(10) Patent No.: US 6,658,634 B1
(45) Date of Patent: Dec. 2, 2003

(54) LOGIC POWER OPTIMIZATION ALGORITHM

(75) Inventors: Kenneth J. Goodnow, Essex Junction, VT (US); Michel S. Michail, Poughkeepsie, NY (US); Clarence R. Ogilvie, Huntington, VT (US); Wilbur D. Pricer, Charlotte, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/073,999

(22) Filed: May 7, 1998

(51) Int. Cl.[7] .............................................. G06F 17/50
(52) U.S. Cl. ............................................. 716/6; 703/19
(58) Field of Search ................................. 364/488, 489, 364/490, 491; 395/500.02–500.22, 500.35, 500.36, 500.37, 500.38; 371/22.1, 22.5, 22.6

(56) References Cited

U.S. PATENT DOCUMENTS

| | | | |
|---|---|---|---|
| 5,392,221 A | * | 2/1995 | Donath et al. ............... 364/489 |
| 5,515,302 A | * | 5/1996 | Horr et al. .................. 364/578 |
| 5,535,134 A | * | 7/1996 | Cohn et al. .................. 364/491 |
| 5,553,000 A | * | 9/1996 | Dey et al. ................... 364/488 |
| 5,557,620 A | | 9/1996 | Miller, Jr. et al. .......... 371/22.5 |
| 5,557,779 A | * | 9/1996 | Minami ....................... 395/500 |
| 5,805,861 A | * | 9/1998 | Gilbert et al. ............... 395/500 |
| 5,862,149 A | * | 1/1999 | Carpenter et al. .......... 371/22.3 |
| 5,880,968 A | * | 3/1999 | Dedhia ........................ 364/489 |
| 5,907,692 A | * | 5/1999 | Wise et al. .................. 395/377 |

OTHER PUBLICATIONS

Benini et al. "Saving Power by Synthesizing Gated Clocks for Sequential Circuits," IEEE Design and Test of Computers, Winter 1994, vol. 11, Issue 4, p. 32–41, Dec. 1994.*

* cited by examiner

Primary Examiner—Paul R. Lintz
Assistant Examiner—Leigh Marie Garbowski
(74) Attorney, Agent, or Firm—Schmeiser, Olsen & Watts LLP

(57) ABSTRACT

Disclosed is a system and method for eliminating the unnecessary toggling of logic in a logic network. The method and system can be incorporated directly into logic synthesis software, or may be implemented manually. Provided is a mechanism for identifying critical nets and then inserting net latches at the critical nets wherein each net latch is controlled by an enable signal that also controls a related output latch. Each net latch is comprised of a circuit which can on command hold static the last logic level on a given logic node.

20 Claims, 8 Drawing Sheets

LOGIC POWER OPTIMIZATION ALGORITHM

BACKGROUND OF THE INVENTION

1. Field of the Invention

The present invention relates to logic networks, and more particularly to a system and method for eliminating the unnecessary toggling of nodes in the logic network.

2. Related Art

Complimentary Metal Oxide Semiconductor (CMOS) technology is now universally applied in digital logic circuits. CMOS devices are fabricated to provide either a high or low output level (e.g., 0 or 5 volts) while drawing very little power from the power supply. Moreover, CMOS circuitry includes the advantage of nearly eliminating DC power. Nonetheless, as the size and complexity of CMOS integrated circuits continue to grow, a need still exists to eliminate the fairly large amount of AC power CMOS circuit designs consume.

In particular, considerable power is wasted in typical CMOS logic network designs because internal nodes toggle uselessly, calculating outputs which are frequently unneeded. In most current logic designs, the focus is on making sure the logic path is functionally correct for some required function in the machine cycle when the output is needed or latched for future use. Almost no focus is spent on paths that are not used in the current cycle. These "unused" paths, made up of many signals, are typically switching up and down until a steady state is reached, even though the output is not used. When the logic designer creates a new logic structure, the focus is on getting the correct output from each portion of the logic network only at the time when the particular output is needed. There is typically no focus on those outputs that are unneeded and unused. This thought process leads to many nodes within the network toggling when, in fact, they are doing no useful work. Thus, present design and synthesis methods for CMOS logic result in considerable wasted power because portions of the logic network are allowed to toggle even when the outputs from these portions are unneeded and unused.

Therefore, without some system of eliminating unnecessary toggling of gates in a CMOS circuit, digital logic designs will continue to consume unnecessarily high amounts of AC power.

SUMMARY OF THE INVENTION

Described herein is a system and method for modifying a digital logic network design to prevent the unnecessary toggling of nodes in the network. In particular, a simple design algorithm is provided to identify and control logic that is not needed during certain operations. The system may be implemented on a computer system in the form of a software program and comprises: a first program code mechanism for identifying and grouping all enabled latches, wherein each enabled latch includes a first input for receiving data from the network, and a second input for receiving a unique enable signal; a second program code mechanism for attaching an attribute to the nets within the network; a third program code mechanism for identifying critical nets; and a fourth program code mechanism for inserting net latches at the critical nets, wherein each of the net latches is controlled by the same enable signal that controls related enabled latches within the network.

Similarly, the method comprises the steps of identifying critical nets in the network, and subsequently placing net latches at each critical net, wherein each net latch is controlled by an enable signal that also controls a related enabled output latch.

Therefore, it is an advantage of the present invention to provide a method and system for eliminating the unnecessary toggling of nodes in a network.

It is therefore a further advantage of the present invention to provide a software program for modifying an existing logic network design.

It is therefore a further advantage of the present invention to reduce wasted power in a CMOS logic network.

BEST MODE FOR CARRYING OUT THE INVENTION

1. Overview

Figure 1:
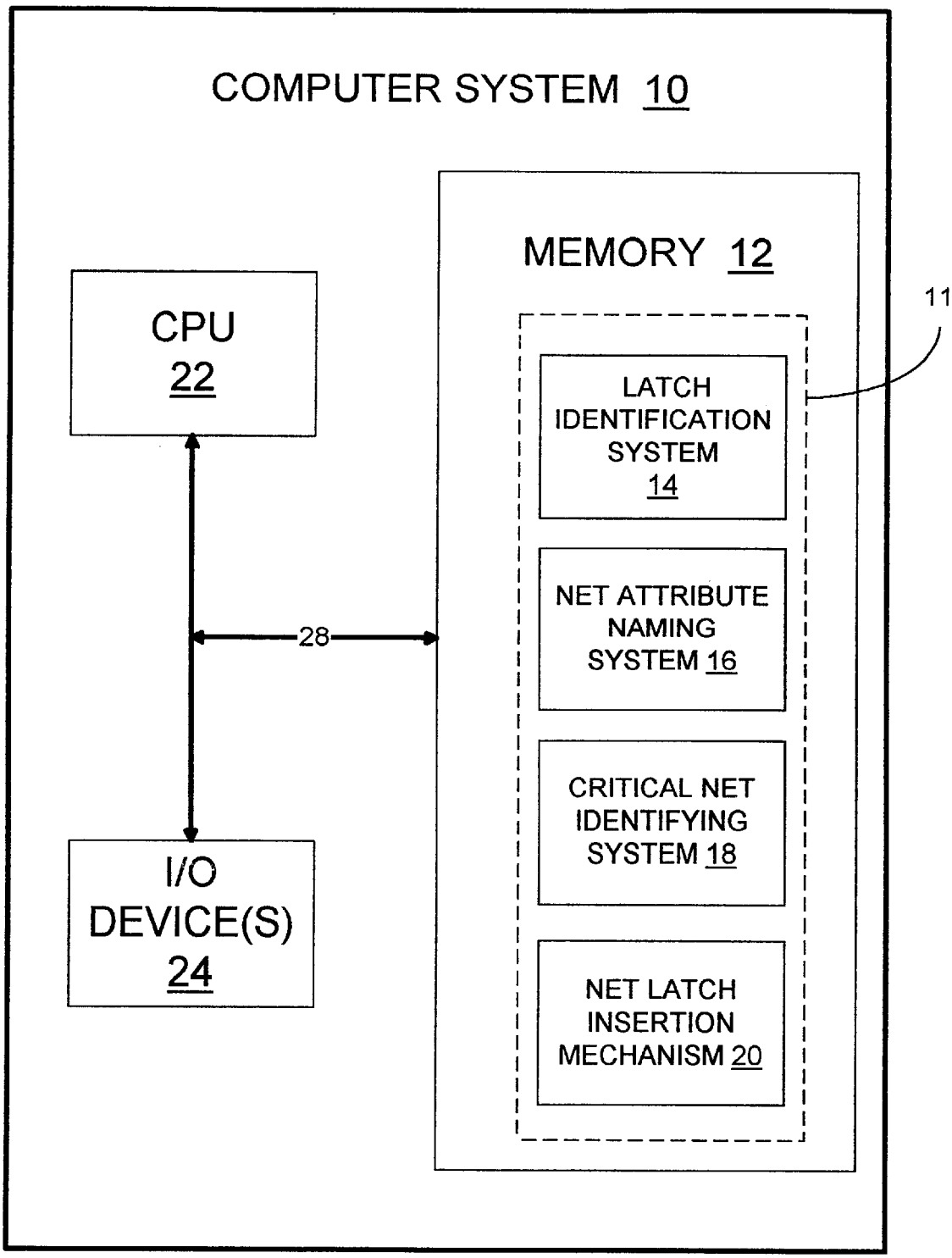
FIG. 1 depicts a computer system with a software program stored in memory in accordance with a preferred embodiment of the present invention.

This invention seeks to provide a mechanism that can be integrated into logic network design tools to eliminate unnecessary toggling of nodes. The invention comprises a simple algorithm that can be incorporated directly into existing logic synthesis software or implemented manually by the logic designer. As a preliminary matter, it is recognized that a typical logic network can be readily organized into fundamental blocks of logic and represented in a logic flow diagram. FIGS. 4–7, which are referred to throughout this discussion, depict a sample flow diagram that is representative of an actual design. The network shown in the figures is comprised of input latches (i.e., Latches A, B and C), nets, logic groups, and output latches (i.e., Latches X, Y and Z). Each logic group comprises combinatorial logic devices capable of calculating output values based upon input values and the functionality of logic contained therein. For example, one logic group could be used to perform an arithmetic adding operation, while another could be used to perform an arithmetic division operation. Typically, the desired results of a given operation are collected at only a single or subset of output latches, even though data is being calculated and delivered to all output latches in the network. Those logic groups that do not contribute to the desired output, will nonetheless be a drain on the power to the network.

As can be seen in FIGS. 4–7, each output latch has a first input for receiving data from a logic group. For example, Latch X receives data from Logic Group L over net 5. In addition, each output latch has a second input for receiving an enable signal. For example, Latch X receives an enable signal, En X. These output latches are therefore referred to herein as "enabled latches" or "enabled output latches." It should be recognized that each of the enabled latches may represent a single latch or a group of related latches, each controlled by a common enable signal. Moreover, each net that feeds a latch or logic group may include any number of actual wires or conductors.

For purposes of clarity, logical paths in a network are defined herein in terms of "data paths" and "cones of logic." A data path for a given enabled latch is defined as a unique "logical" sequence of nets and logic groups that feed the enabled latch. A cone of logic for a given enabled latch is defined as all of the data paths associated with the enabled latch. A net is "related" to an enabled latch if the net is in the "cone of logic" of the enabled latch. Thus, with reference to FIG. 4, Latch X has a first data path comprised of net 5, Logic Group L, and net 1, and a second data path comprised of net 5, Logic Group L, and net 2. The cone of logic of Latch X comprises the first and second data path and nets 1, 2 and 5 are "related" to Latch X.

It should also be noted that certain nets have a one-to-one input/output relationship (e.g., net 1), while others have a one-to-many input/output relationship (e.g., net 2). Those nets that have a one-to-many relationship are defined herein as "branching nets" since their output is branched to more than one location. Each branching net includes an "input portion" 50, and a plurality of "branches" 52, 54.

Figure 8:
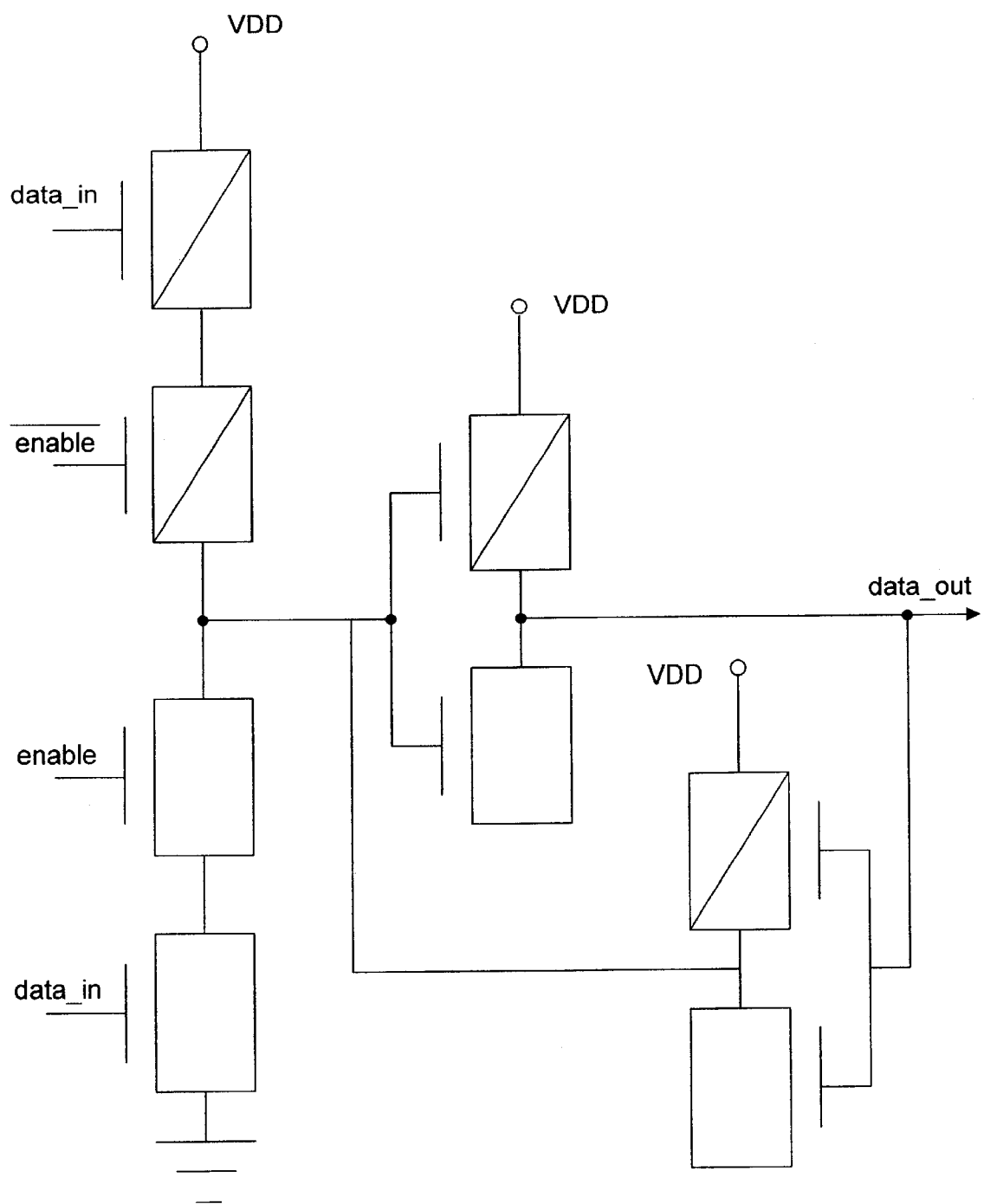
FIG. 8 depicts a circuit capable of holding static the last logic level on a given logic node, in accordance with a preferred embodiment of the present invention.

This invention identifies critical nets in the network, which, when properly controlled with an enabling device, eliminates the unnecessary toggling of logic devices. The system used to accomplish this requires that the logic library include a circuit which, on command, can hold "static" the last logic level on a given logic node. The circuit in FIG. 8 depicts a circuit with this functionality. The circuit shown in FIG. 8 is a simple variation on the common "set/reset-latch." Any comparable circuit could likewise be substituted therefor. The latch shown in FIG. 8 will set or reset following the input logic signal only when enabled. When disabled, the latch will hold the last logic input before being disabled. In the subsequent discussion, this function will be referred to as the "net latch" circuit function. This invention determines where the "net latch" circuit functions should be inserted and what signals should control the net latches after the logic designer has finished the traditional task of designing a circuit.

The net latch shown in FIG. 8 is a device with 2 inputs (data_in and enable) and an output (data_out). When the enable input is active, the data_out equals the data_in. When the enable input is inactive, the data_out is the value that was on the data_in at the time of the enable transitioned to inactive.

Fundamental aspects of this invention therefore include: (1) a mechanism for identifying critical nets, (2) a net latch mechanism placeable at each critical net and capable of holding the value on a given critical net, and (3) a system for controlling each net latch. With the appropriate introduction or insertion of the net latch to hold the value on a given net, the unnecessary or parasitic switching that often occurs in any given path during most functional operations can be eliminated. Eliminating the switching thus minimizes the parasitic AC power consumption.

2. Detailed Description

Referring now to the drawings, FIG. 1 depicts a computer system 10 having a central processing unit (CPU) 22, input/output (I/O) devices 24, bus 28 and memory 12. It is recognized that computer system 10 may include additional components and/or may have its components residing in different physical locations on different physical devices. Memory 12 is shown containing a software program 11 comprised of 4 modules. Memory 12 may be implemented by any known type of memory system capable of holding software programs, such as a hard drive, an optical disk, RAM, ROM, a transmission medium, magnetic tape and/or magnetic disks. Computer software program 11 is shown including a latch identification system 14, a net attribute naming system 16, a critical net identifying system 18, and a latching net insertion mechanism 20.

Figure 4:
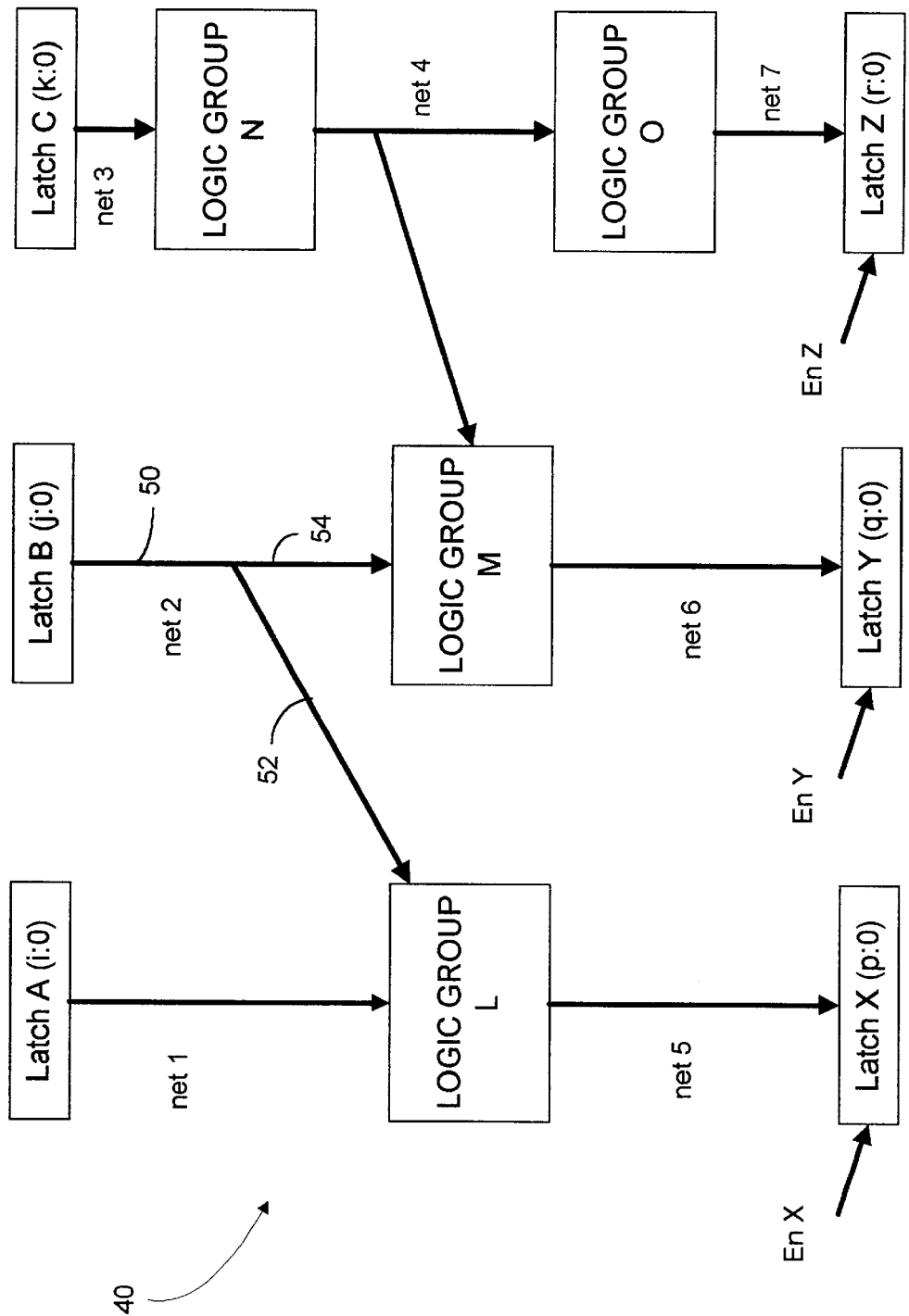
FIG. 4 depicts a logic flow schematic of a network after the step of identifying and collecting latched groups has been completed in accordance with a preferred embodiment of the present invention.

Latch identification system 14 includes a system for identifying and grouping all enabled latches, wherein each of the enabled latches comprises a first input for receiving data from at least one data path and a second input for receiving a unique enable signal. The latch identification system 14 groups all latches together that are controlled by the same enable signal. FIG. 4 depicts a representation of a logic network 40 after this program code has executed and caused all of the enabled latches to be identified and grouped.

Net attribute naming system 16 provides the mechanism for attaching attributes to each net in the network. In particular, each net will receive a naming attribute for each enabled latch that includes the net in its cone of logic. Thus, if a net (e.g., net 1) is part of a data path that will eventually feed Latch X only, then that net will receive an attribute of an "x". If the net is identified as one that is part of data paths for both Latch X and Latch Y (e.g., net 2), then that net will receive attributes of both x and y. Critical net identifying system 18 provides a mechanism for identifying critical nets based on their attributes and position in the network. Net latch insertion mechanism 20 provides a mechanism for inserting net latches at each of the identified critical nets.

Figure 2:
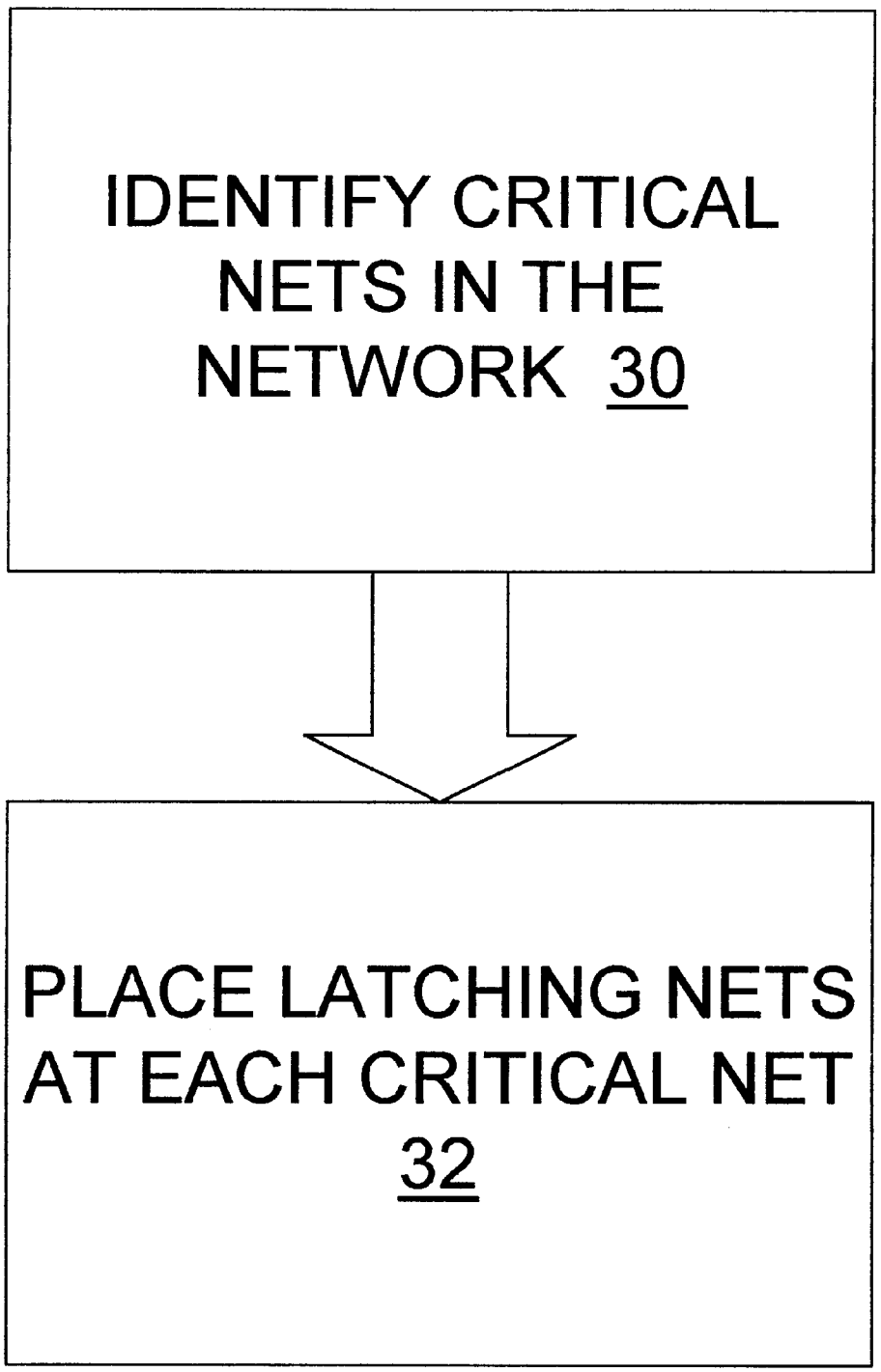
FIG. 2 depicts a high level flow diagram of a method of eliminating unnecessary toggling in accordance with a preferred embodiment of the present invention.

While this preferred embodiment details a specific method for identifying critical nets, it is understood that any method of choosing nets controllable with the same enable signals that control to output latches falls within the purview of this invention. FIG. 2 depicts a flow diagram of this concept wherein the first step 30 is to identify critical nets in the network and the second step 32 places net latches at each critical net.

Figure 3:
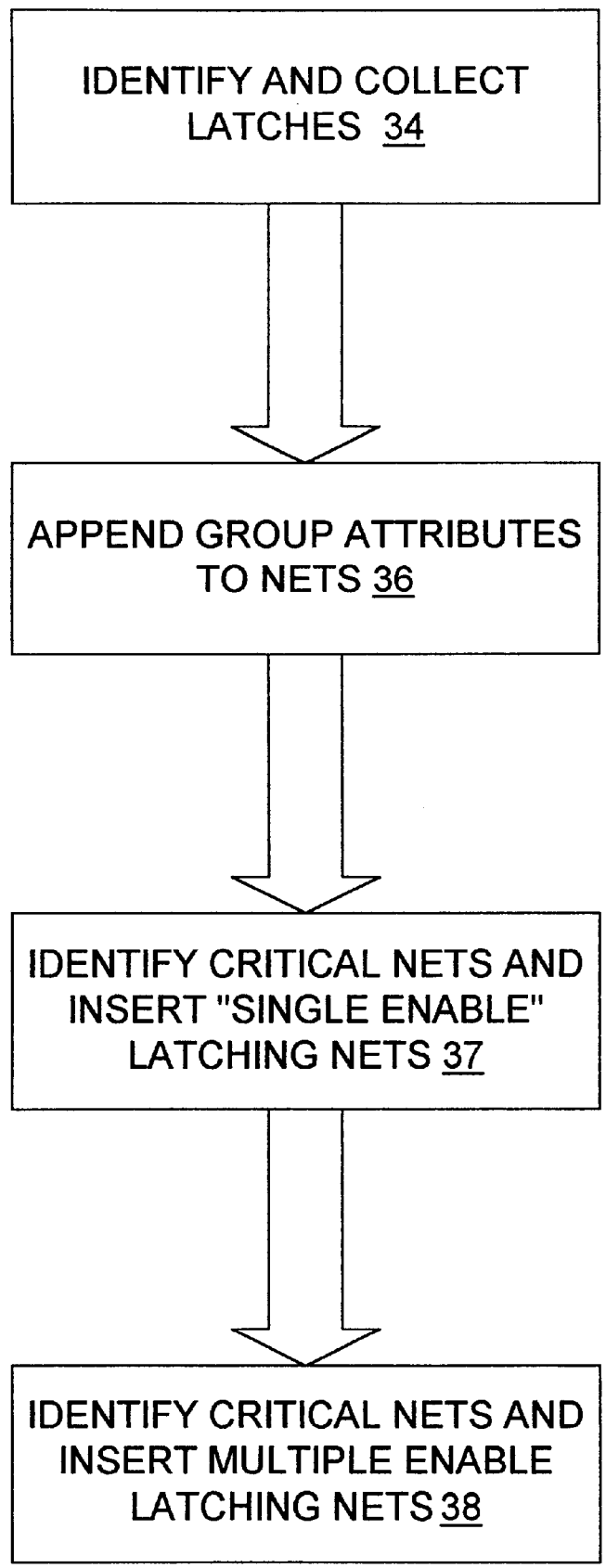
FIG. 3 depicts a flow diagram of a method of eliminating unnecessary toggling in accordance with a preferred embodiment of the present invention.

FIG. 3 depicts a more specific method for implementing this invention. The first step 34 is to identify and collect latches, such that all latches that are controlled by the same enable signal are grouped together. Next, group attributes are appended 36 to each of the nets in the network. In this step 36, each net in the network is provided with an attribute identifying which of the enabled latches includes the net in the enabled latch's cone of logic. These attributes can then be used to identify critical nets in the network. A system for identifying critical nets is described below with reference to FIGS. 4–7. Next, "single enable" net latches are inserted 37 at identified critical nets within the network. A "single enable" net latch is a net latch that is controlled by only a single enable signal. Thus, if a critical net is found with an output or output branch that only logically feeds into a single enable latch, (i.e., the output of the net resides in only one cone of logic), then a single enable net latch is inserted.

Finally, multiple enable net latches are inserted 38 into the network. A multiple enable latching net is defined as a net latch that is controlled by more than one enable signal. Therefore, if a critical net is identified as having an output or output branch that logically feeds into multiple enable latches, that a multiple enable net latch is inserted.

FIG. 4 depicts a flow diagram of a logic network 40 after the first step of identifying and collecting latches has been performed. As depicted, latches A, B and C input data into a network comprising nets 1–7 and logic groups L, M, N and O. Enabled latches (or output latches) X, Y and Z capture the data generated by the network. For clarity of this description, latches A, B and C are unique from X, Y and Z. However, in general, there is no reason why latches A, B and C could not be one in the same as latches X, Y and Z. The enable signals on latches X, Y and Z allow each of these enabled latches to capture and hold the value on nets 5, 6 and 7, respectively. These enable signals are typically driven from control logic, for example, a state machine or instruction decode logic, in the case of a processor. As is the case in FIG. 4, the logic network should be configured with an identified enable on its output latches such that only when the value on the net is needed, should the enable be activated. Many, (except free running latches) if not all latches are, or can be designed with enables that are only activated when the contents are needed. Once these enables are identified, they can be used by the inserted net latches to automatically save the AC parasitic power. Note that while this system is described in terms of inputs to latches, the inputs could also be any terminal point in the design.

Figure 5:
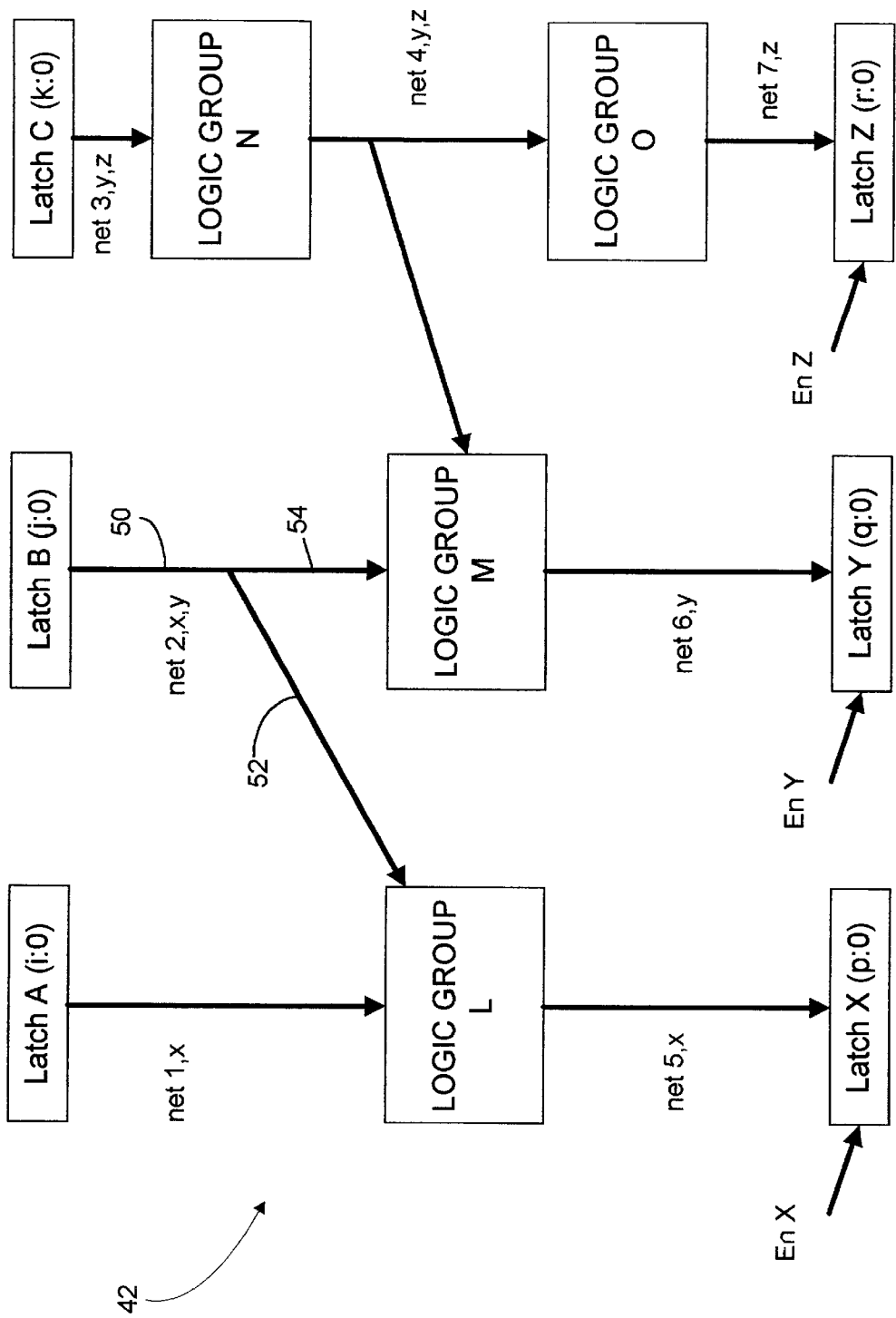
FIG. 5 depicts a logic flow schematic of FIG. 4 with attributes appended to each net in the network in accordance with a preferred embodiment of the present invention.

Referring now to FIG. 5, the network of FIG. 4 is shown after the step of appending group attributes to the network 42 has been performed. Here, it can be seen that each net has been given an attribute that identifies each enabled latch that includes the net in the enabled latch's cone of logic. Thus, each attribute describes one or more enabled latches in the network. In other words, if the net is part of data path that feeds a particular enabled latch, it will be reflected in the attribute. Referring to FIG. 5, net 1 has an attribute of "x" because the net 1 is part of a data path that flows to latch X. Alternatively, net 2 has an attribute of "x, y" because net 2 is part of a first data path that will feed into latch X and is also part of a second data path that will feed into latch Y.

Wiring nets are identified as a first type of network if they carry signal eventually, but not directly feeding into one of the identified output latches (e.g., net 1). Wiring nets may be identified as a second type of network if they carry signals that eventually feed into more than one of the identified output latches (e.g., net 2 and net 4). Each of these nets include "branches" that split off to carry signals along different paths.

One method of implementing the attribute appending process is to (1) start from the inputs of all enabled latches, (2) work back through all data paths that feed into the enabled latch, and (3) attach a feeding latch attribute to each net. FIG. 5 depicts a network 42 after these attributes have been attached thereto.

Figure 6:
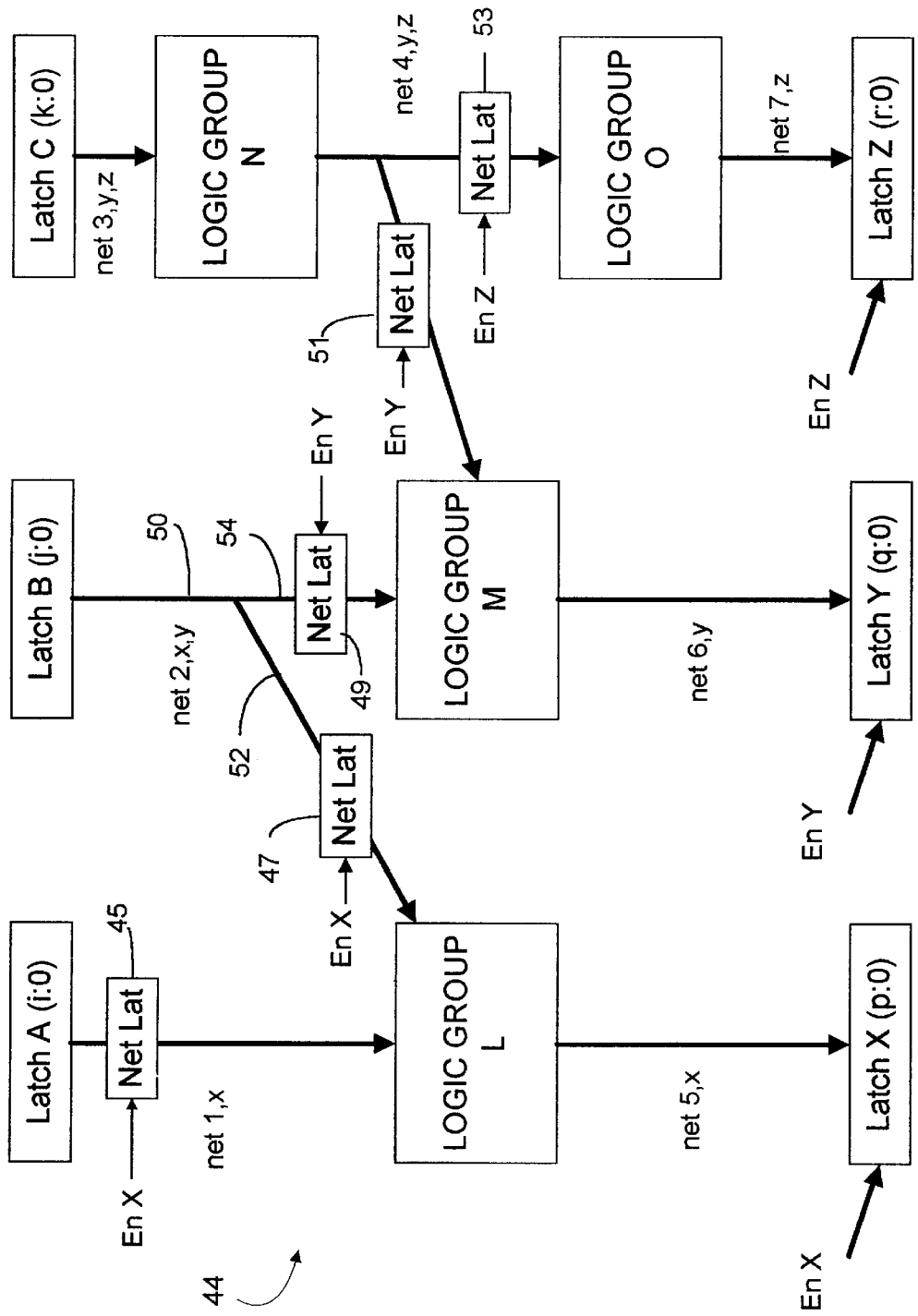
FIG. 6 depicts the logic flow schematic of FIG. 5 with single enable latch nets placed on certain critical nets in accordance with a preferred embodiment of the present invention.
Figure 7:
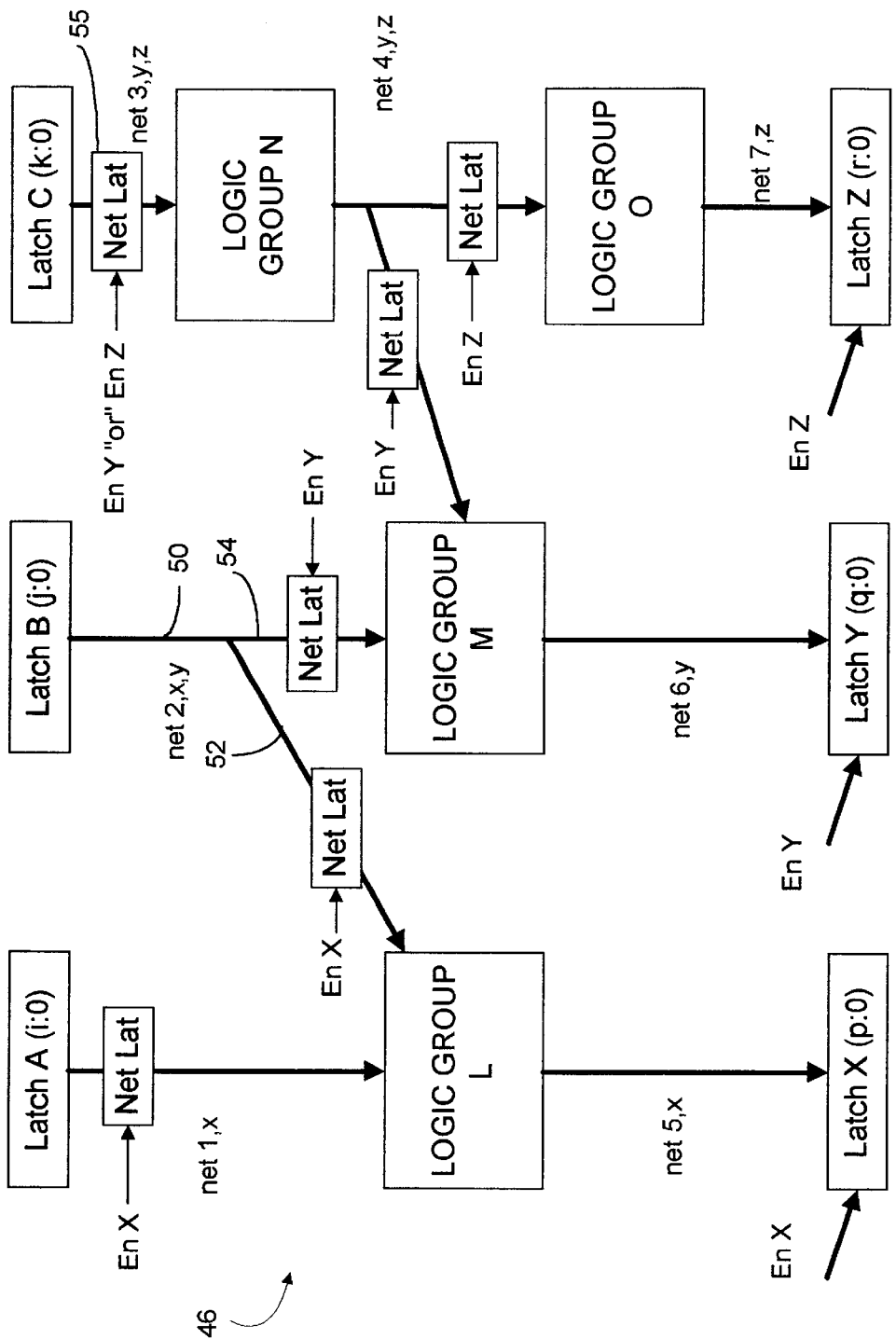
FIG. 7 depicts the logic flow schematic of FIG. 6 with multiple enable latch nets placed on certain critical nets in the logic network in accordance with a preferred embodiment of the present invention.

FIGS. 6 and 7 depict the logic network after the steps of inserting single and multiple enable net latches (labeled therein as Net Lat's) has been performed. These steps involve the process of identifying critical nets in the network, which, if properly controlled, could reduce the parasitic A/C power consumption. Once identified, net latches, as described above, are placed at each of the identified critical nets. Each net latch is controlled by the same enable signal or signals that control related enabled latches, X, Y, Z.

FIG. 6 depicts the network 44 with the single enable net latches inserted in conformance with step 3 of FIG. 3. The process involves first identifying critical nets requiring a "single enable" net latch, which may be accomplished as follows. Starting at each enabled latch, X, Y, Z, traverse back through each data path until either a net is reached that has an attribute on it other than the latch group you started from, or until a latch is reached. In other words, each data path is traversed backward from the enabled latch until a branch is reached or until a net is reached that receives its input from another latch. At these locations, a single enable latch net is to be inserted. For example, when traversing back through the data paths associated with latch X, net 1 is identified as a net that receives its input from another latch. Therefore, net 1 receives a single enable net latch 45 controlled by the same enable signal controlling latch X (i.e., En X). Net 2 is likewise identified as a critical net because it has an attribute on it other than latch X. In this case it has an attribute on it of "x, y". Therefore, a single enable net latch 47 controlled by the same enable signal (En X) that controls latch X is likewise placed on net 2. Note that the net latch 47 is placed on the branched portion 52 of the net in order to control the flow of data to latch X. Subsequently, additional net latches, 49, 51 and 53, are likewise inserted into the network where needed.

Referring now to FIG. 7, the process of inserting "multiple enable" net latches into the network 46 has been performed. In this step, critical nets are identified as those nets that need to be controlled by more than one enable signal because the identified critical net is part of a data path that later feeds into more than one enabled latch. Thus, these net latches must be enabled any time any one of the related enabled latches is enabled. For example, referring to FIG. 7, net 3 includes a multiple enable net latch 55. It can be seen that net 3 is part of a data path that feeds into both latch Y and latch Z. In this case, anytime either latch Y or latch Z are enabled, the net latch at net 3 will likewise be enabled. The only time the net latch 55 on net 3 will not be enabled is when neither latch Y, nor latch Z are enabled.

One method of identifying nets that require multiple enable latching nets is as follows. First, start at each branching net that has logic preceding it (e.g., net 4), trace back through each data path leading to that branching net until (1) a net is reached that has an attribute on it other than the enabled latch group or groups on the branching net, or (2) a latch is reached. Next, a multiple enable net latch is inserted at this point with the enables of the attributes for that net. This step must then repeated for all branching nets that have logic groups preceding or upstream from the branching net. FIG. 7 depicts the result of this step. It can be seen that in the network 46, only net 4 is a branching net with logic groups and nets preceding it. Therefore, the data path preceding net 4 is traversed back until, in this case, a latch (latch C) is reached. A multiple enable net latch 55 is then placed on net 3 controlled by enable signals reflected in the net's attributes. In this case, net 4 is controlled by both "En Y" and "En Z".

The foregoing descriptions of the preferred embodiments of the invention have been presented for purposes of illustration and description only and they are not intended to be exhaustive or to limit the invention to the precise form disclosed, and obviously many modifications and variations are possible in light of the above teachings. Such modifications and variations that may be apparent to a person skilled in the art are intended to be included within the scope of this invention as defined in the accompanying claims.

We claim:

1. A method for modifying a digital logic network design to prevent unnecessary toggling of nodes in the network, wherein the digital logic network includes input latches and enabled output latches, wherein each enabled output latch receives data from at least one data path, and wherein each of said at least one data paths is comprised of sequentially arranged nets and logic groups, the method comprising the steps of:

identifying critical nets in the network by identifying wiring networks that carry signals that eventually feed into one or more output latches; and placing at least one net latch at each of a plurality of the critical nets, wherein each net latch is controlled by an enable signal that also controls a related enabled output latch.

2. The method of claim 1 wherein said step of placing at least one net latch at each of a plurality of the critical nets includes the steps of inserting single enable net latches and multiple enable latches.

3. The method of claim 1 wherein an enabled output latch is related to a critical net if the critical net is within a cone of logic of the enabled output latch.

4. The method of claim 1 wherein the step of identifying critical nets comprises the step of tracing back through each data path from each enabled output latch until either a branching net is encountered or until one of said input latches is encountered.

5. The method of claim 4 wherein the step of identifying critical nets further comprises the steps of:

identifying each branching net that is preceded by a logic group; and tracing back from each identified branching net until either a previous branching net is encountered or until one of said input latches is encountered.

6. The method of claim 1, wherein the step of inserting net latches includes the step of inserting the net latch on a branched portion of the net if the net is a branching net.

7. The method of claim 1 wherein the step of identifying critical nets in the network by identifying wiring networks that carry signals that eventually feed into one or more output latches comprises the steps of:

identifying critical nets in first type wiring networks that require a single enable net latch, said first type wiring network comprising pathways that carry signals eventually, but not directly feeding into only one of the output latches; and identifying second type wiring networks, said second type wiring networks comprising pathways that carry signals eventually feeding into more than one of the output latches;

identifying critical nets in the second type wiring networks that require a single enable net latch by identifying inputs to branches in the second type wiring networks, the branches downstream and split off from said pathways and carrying signals eventually feeding into only one of the output latches; and wherein the step of placing at least one net latch at each of a plurality of the critical nets comprises the steps of:

placing at least one single enable latch at each of a plurality of the identified critical nets in the first type wiring networks; and placing at least one single enable latch at each of a plurality of the identified critical nets in the second type wiring networks.

8. The method of claim 1 wherein the step of identifying critical nets in the network by identifying wiring networks that carry signals that eventually feed into one or more output latches comprises the steps of:

identifying second type wiring networks, said second type wiring networks comprising pathways that carry signals eventually feeding into more than one of the output latches;

identifying branches in the second type wiring networks, downstream and split off from the pathways; and identifying critical nets that require multiple enable net latches by identifying pathways having the identified branches that also have at least one logic, group upstream one of the identified branches; and wherein the step of placing at least one net latch at each of a plurality of the critical nets comprises the step of inserting multiple enable net latches at those critical nets identified as requiring said multiple enable net latches.

9. A computer program product comprising:

a computer usable medium having a computer readable program code embodied therein for modifying a digital logic network to prevent unnecessary toggling of nodes in the digital logic network, wherein the digital logic network includes input latches and enabled output latches, wherein each enabled output latch receives data from at least one data path, and wherein each of said at least one data paths is comprised of sequentially arranged nets and logic groups, the computer readable program code comprising:

a first mechanism for identifying and grouping enabled output latches that are controlled by a common enable signal;

a second mechanism for attaching a name attribute to each net, wherein each net receives a name attribute that identifies all of the enabled output latches related to the net;

a third mechanism for identifying critical nets by identifying wiring networks that carry signals that eventually feed into one or more output latches; and a fourth mechanism for inserting net latches at each critical net.

10. The computer program product of claim 9 wherein the third mechanism for identifying critical nets includes a first system for identifying critical nets that require a single enable net latch, and a second system for identifying critical nets that require a multiple enable net latch.

11. The computer program product of claim 10, wherein the first system for identifying critical nets that require single enable net latches comprises a system for traversing back along each data path from the related enabled input latch until either a branching net is encountered, or a net is encountered which receives its input from one of the input latches.

12. The computer program product of claim 10 wherein the second system for identifying critical nets that require multiple enable net latches comprises:

a system for identifying branching nets that receive input from one of the logic groups; and a system for traversing back along each data path from each identified branching net until either a previous branching net is encountered, or a net is encountered which receives its input from one of the input latches.

13. The computer program product of claim 9 wherein a predetermined enabled output latch is related to a predetermined net if the predetermined net is in a cone of logic of the predetermined enabled output latch.

14. The computer program product of claim 9 wherein the fourth mechanism for inserting net latches at each critical net inserts each net latches such that the net latch is controlled by an enable signal which also controls a related enabled output latch.

15. A method for modifying a digital logic network design to prevent unnecessary toggling of nodes in the network; wherein the digital logic network includes input latches and enabled output latches, wherein each enabled output latch receives data from at least one data path, and wherein each of said at least one data paths is comprised of sequentially arranged nets and logic groups, the method comprising the steps of:

identifying and grouping enabled output latches that are controlled by a common enable signal;

attaching a name attribute to each net, wherein each net receives a name attribute that identifies all of the enabled output latches related to the net;

identifying first type wiring networks that require a single enable net latch, said first type wiring networks comprising critical nets that carry signals eventually, but not directly feeding into only one of the identified output latches;

inserting single enable net latches at an input of each of the first type wiring networks;

identifying second type wiring networks that require a multiple enable net latch, said second type wiring networks comprising pathways that carry signals eventually feeding into more than one of the identified output latches, said step of identifying second type networks that require a multiple enable net latch comprising:

identifying branches in the second type wiring networks, downstream and split off from the pathways:

identifying critical nets in pathways having the identified branches by identifying pathways that have at least one logic group upstream one of the identified branches; and inserting multiple enable net latches at those critical nets identified as requiring said multiple enable net latches.

16. The method of claim 15 wherein the step of inserting single enable net latches includes the step of providing a mechanism for controlling each single enable net latch with the same enable signal that controls a related enabled output latch.

17. The method of claim 15 wherein the step of inserting multiple enable net latches includes the step of providing a mechanism for controlling each multiple enable net latch with the same enable signals that controls the related enabled output latches.

18. The method of claim 15 wherein the step of identifying first type wiring networks, comprises the step of:

for each data path within each enabled output latch's cone of logic, traversing back along each data path until either a branching net is encountered or a net that receives its input from one of the input latches is encountered.

19. The method of claim 18 wherein the step of identifying second type wiring networks, comprises the step of:

for each branching net that receives its input from a logic group, traversing back along the data path until either a previous branching net is encountered or a net that receives its input from one of the input latches is encountered.

20. Method for controlling signal propagation through a circuit, the method comprising:

identifying output latches of the circuit that comprise an enabling input for receiving an enabling input signal including identifying ones of the latches responsive to common enabling input signals;

identifying first type wiring networks of the circuit that carry signals eventually, but not directly feeding into the only one of the identified output latches;

identifying second type wiring networks having pathways that carry signals eventually feeding into more than one of the identified output latches;

identifying branches in the second type wiring networks, downstream and split off from said pathways, that carry signals eventually feeding into only one of the identified output latches;

placing a latching net circuit at an input of each of the first type wiring networks and at an input of each of said branches; and coupling an enabling input of each of the latching net circuits, through which signals pass eventually feeding a corresponding one of the output latches, to receive a same enabling input signal as that received by said corresponding one of the output latches.

* * * * *